No. 732,367. PATENTED JUNE 30, 1903.
H. E. MELVILLE.
TRUCK.
APPLICATION FILED APR. 10, 1903.
NO MODEL.
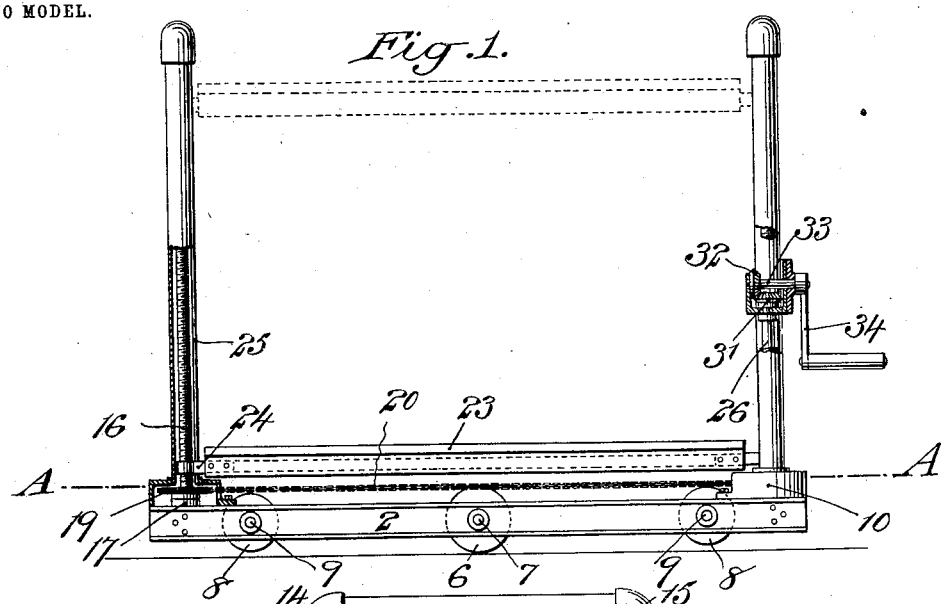
Fig. 1.
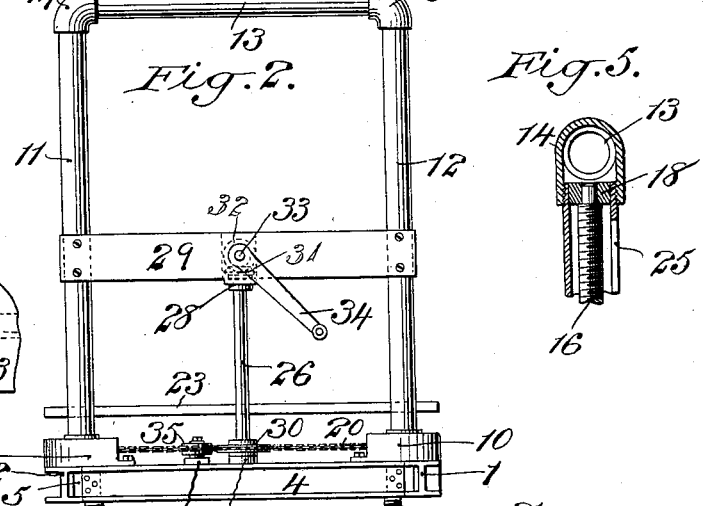
Fig. 2.
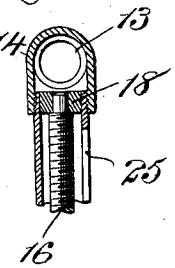
Fig. 5.
Fig. 4.
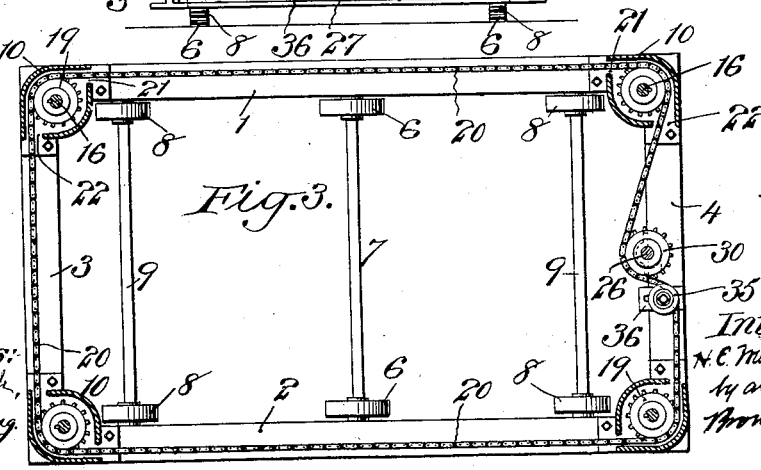
Fig. 3.
Witnesses:
George Barry
J. G. Hachenberg
Inventor:
H. E. Melville
by attorney No. 732,367.                                                    Patented June 30, 1903.

UNITED STATES PATENT OFFICE.

HENDRICKS E. MELVILLE, OF NEW YORK, N. Y.

TRUCK.

SPECIFICATION forming part of Letters Patent No. 732,367, dated June 30, 1903.

Application filed April 10, 1903. Serial No. 152,017. (No model.)

*To all whom it may concern:*

Be it known that I, HENDRICKS E. MELVILLE, a citizen of the United States, and a resident of the borough of Manhattan, in the city and State of New York, have invented a new and useful Improvement in Trucks, of which the following is a specification.

My invention relates to an improvement in trucks, and is more particularly directed to certain improvements in that class of trucks in which a vertically-adjustable platform is provided.

The object of my invention is to provide a truck of the above character which will be extremely strong and simple in construction, the movable platform being simultaneously raised and lowered at its four corners and so supported as to permit the truck to be used for conveying and elevating very heavy articles.

A further object is to provide certain improvements in the construction, form, and arrangement of the several parts whereby a truck is provided in which the platform may be lowered into close proximity to the floor and is permitted an extended vertical adjustment without tending to weaken the truck.

A practical embodiment of my invention is represented in the accompanying drawings, in which—

Figure 1 represents the truck in side elevation with the adjustable platform shown in full lines at the limit of its lowered position and in dotted lines near the limit of its upward position, certain of the parts being broken away to more clearly show the means for raising and lowering the platform. Fig. 2 is an end view of the truck. Fig. 3 is a horizontal section taken in the plane of the line A A of Fig. 1. Fig. 4 is a detail view showing one of the connections between the platform and screw, and Fig. 5 is an enlarged detail view showing the manner of rotatably mounting the upper end of one of the screws.

The base of the truck is composed of two longitudinal side bars 1 and 2, and cross-bars 3 and 4, connecting the ends of the side bars. These bars are of angle-iron construction and are herein shown as composed of I-beams. Corner-brackets 5 are riveted to the adjacent end and side bars for securing them together. This base is provided with traction-wheels arranged in pairs. In the present instance I have shown one pair of large traction-wheels 6, carried by an axle 7, mounted in the side bars 1 and 2 of the base. Upon each side of the traction-wheels 6 I provide a pair of smaller traction-wheels 8, carried by an axle 9, mounted in the side bars 1 and 2. These traction-wheels are preferably so arranged that one pair or the other pair of the auxiliary traction-wheels 8 are brought into use with the main traction-wheel 6, thus providing a truck which may be easily turned and moved in any direction. The corners of the base are still further reinforced by four casings 10, bolted to the adjacent ends of the side and cross bars and serving as housings for the sprockets carried by the screws to be hereinafter described.

At each end of the truck I provide two tubular posts 11 and 12, which uprise from the tops of the casings 10. The tops of these tubular posts 11 and 12 are spaced apart by a cross-post 13, connected to the said posts 11 and 12 by suitable elbow-couplings 14 15. A rotary screw 16 uprises from the base in the interior of each one of the vertical posts, the lower end of each screw having a suitable bearing 17 on the base and the top of each screw having a supporting-bearing 18 in the top of the vertical posts. Each one of these screws 16 is provided at its lower end within the casing 10 with a sprocket 19. A sprocket drive-chain 20 passes around all of the four sprockets 19, each one of the casings 10 being provided with slots 21 22 in its walls for the passage therethrough of the said chain.

The adjustable platform is denoted by 23, and at each corner thereof it is provided with a traveling nut 24, engaged with one of the screws 16. Each one of the vertical posts is provided with a vertically-elongated slot 25, through which the shank of the traveling nut 24 passes.

The means which I have shown for controlling the movement of the chain 20 and thereby the screws for raising and lowering the platform is constructed, arranged, and operated as follows: A vertical shaft 26 is mounted in a suitable bearing 27 at its lower end in one end of the end cross-bars of the base, in the present instance in the cross-bar 4. The upper end of the shaft 26 is mounted in a suitable bearing 28, carried by a crossbar 29, secured to the vertical tubular posts 11 and 12. A drive-sprocket 30 is fixed to rotate with the shaft 26 and is in engagement with the sprocket drive-chain 20. The upper end of the shaft 26 is provided with a beveled gear 31, which meshes with a bevel-gear 32, carried by a horizontal crank-shaft 33, also mounted in the cross-bar 29. This crank-shaft 33 is provided with a suitable crank-handle 34 for the use of the person operating the truck.

An idler-pulley 35 is adjustably mounted in a support 36, carried by the cross-bar 4 of the base, which idler-pulley serves to take up the slack in the drive-chain 20 and also hold the chain in engagement with the drive-sprocket 30.

The truck as herein described is extremely simple and strong.

By providing vertical tubular posts connected at their upper ends and by supporting the screws at their upper and lower ends I am enabled to raise the platform to the tops of the screws without weakening the truck. This is a very important feature in my invention. Furthermore, in the structure herein described the platform may be brought down into close proximity to the floor for permitting the ready loading thereon of extremely heavy and bulky articles.

What I claim is—

1. In an elevating-truck, a base, traction-wheels carried thereby, screws uprising from the four corners of the base, a platform engaging said screws, sprockets fixed to the screws, a drive-chain engaging said sprockets, a drive-sprocket engaging the chain and a rotary crank-shaft having a geared connection with the drive-sprocket for operating it and thereby the chain for rotating all of the screws simultaneously to raise and lower the platform.

2. In an elevating-truck, a base, traction-wheels carried thereby, two posts uprising from each end of the base, means for rigidly connecting the tops of said posts, screws uprising from the base within the posts having bearings at their lower ends in the base and at their upper ends in the posts, a platform engaging said screws, sprockets fixed to the screws, a drive-chain engaging said sprockets and means for operating the drive-chain to raise and lower the platform.

3. In an elevating-truck, a base, traction-wheels carried thereby, screws uprising from the base, sprockets fixed to the screws at their lower ends, casings secured to the base forming housings for the sprockets, posts uprising from the casings inclosing the screws, said posts having vertically-elongated slots therein, a platform having nuts extended through said slots in the posts into engagement with the screws, a drive-chain engaging the sprockets and means for operating the drive-chain to raise and lower the platform.

In testimony that I claim the foregoing as my invention I have signed my name, in presence of two witnesses, this 8th day of April, 1903.

HENDRICKS E. MELVILLE.

Witnesses:
FREDK. HAYNES,
GEORGE BARRY, Jr.